Figure 1:
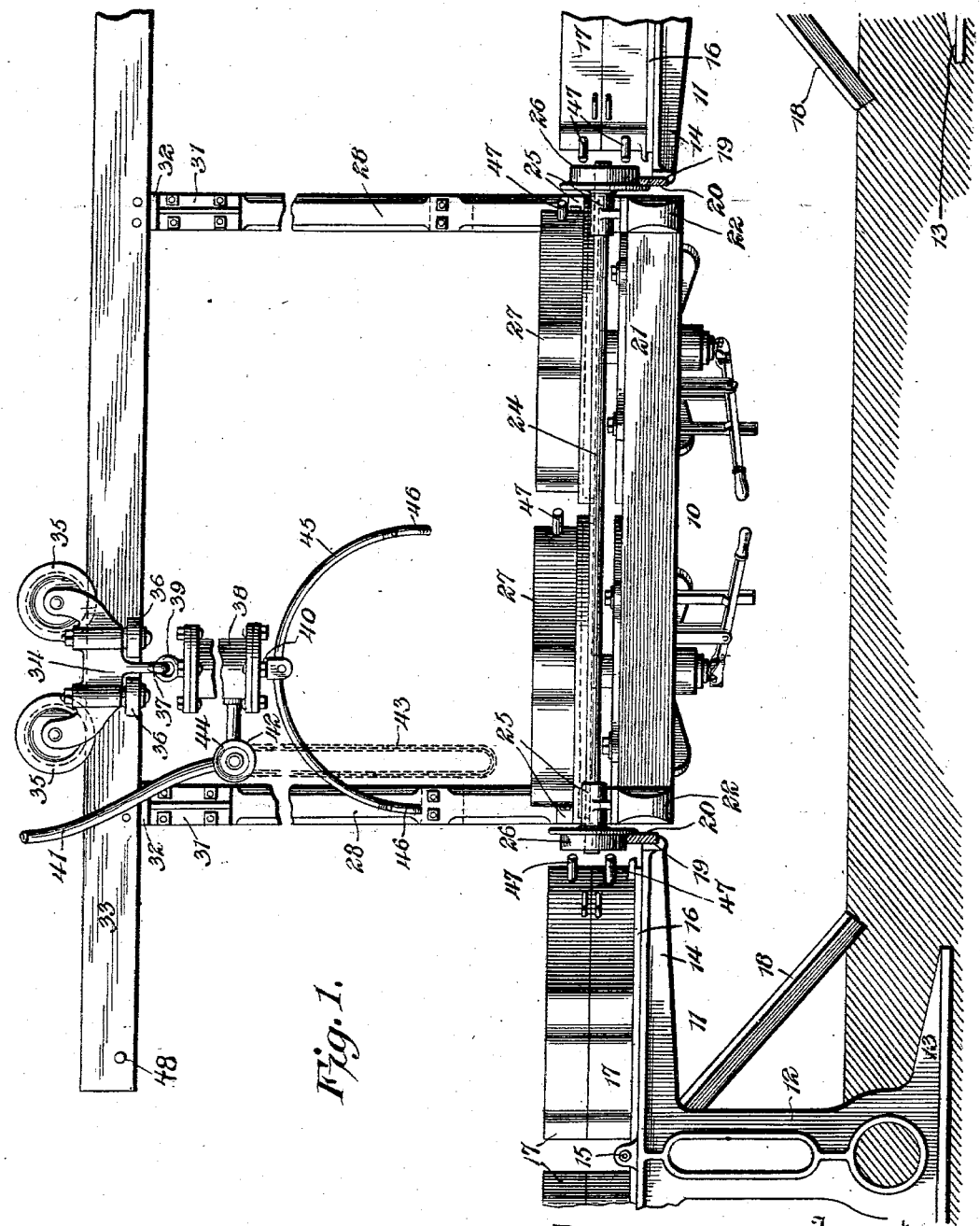

No. 745,649. PATENTED DEC. 1, 1903.
J. R. McWANE.
MOLDING AND CASTING APPARATUS.
APPLICATION FILED JUNE 7, 1902.
NO MODEL. 3 SHEETS—SHEET 1.

Witnesses
Howard D. Orr.
B. G. Foster

James R. McWane, Inventor,
By C. G. Siggers,
Attorney

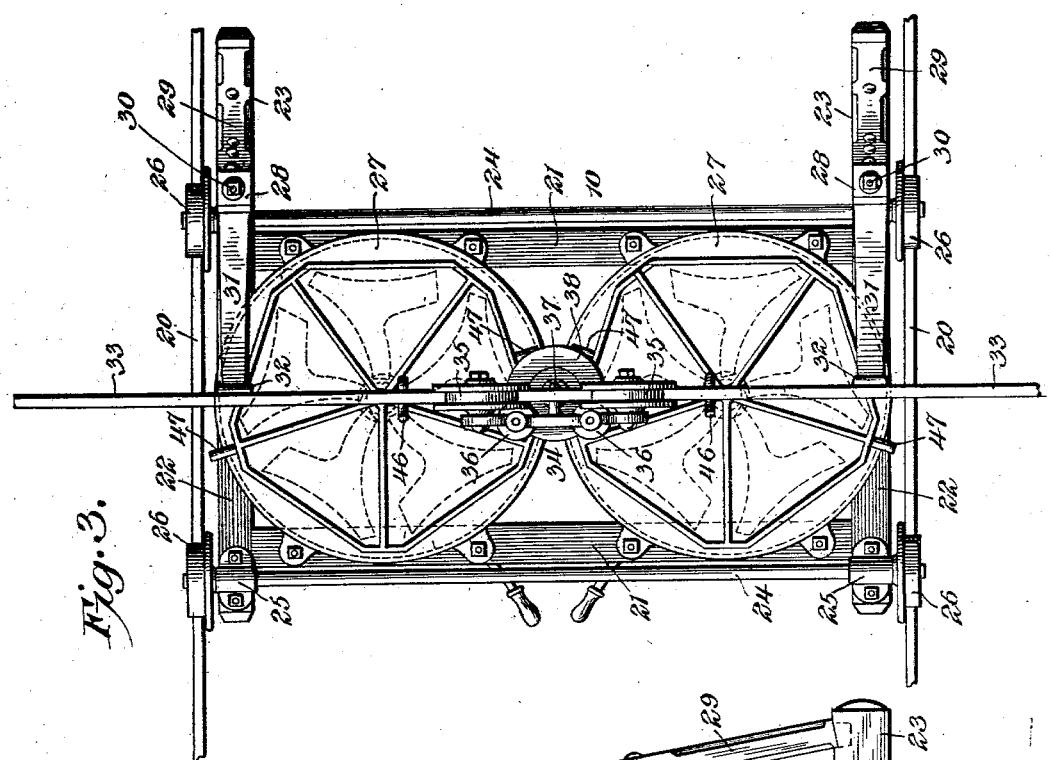

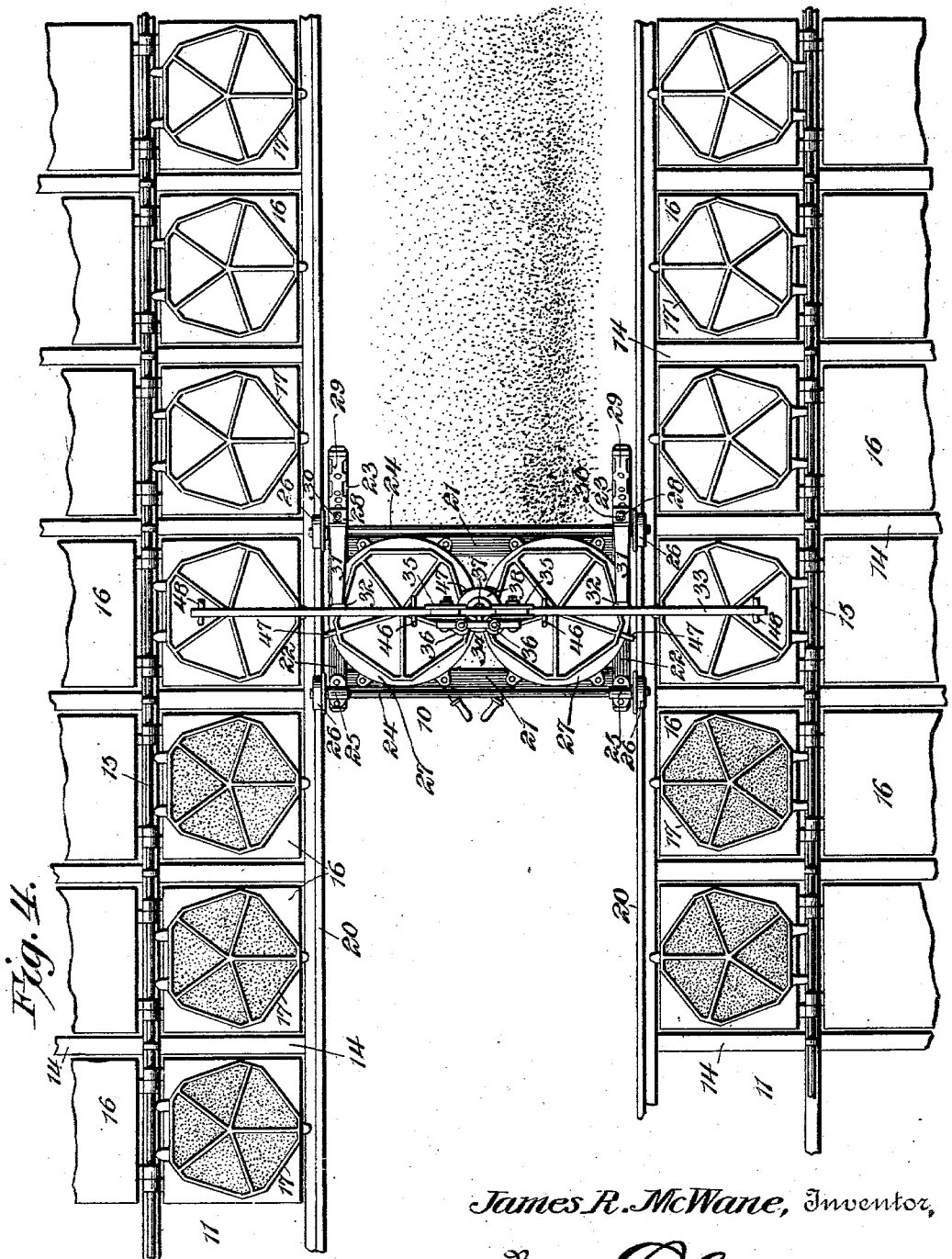

No. 745,649. Patented December 1, 1903.

UNITED STATES PATENT OFFICE.

JAMES R. McWANE, OF LYNCHBURG, VIRGINIA.

MOLDING AND CASTING APPARATUS.

SPECIFICATION forming part of Letters Patent No. 745,649, dated December 1, 1903.

Application filed June 7, 1902. Serial No. 110,672. (No model.)

*To all whom it may concern:*

Be it known that I, JAMES R. MCWANE, a citizen of the United States, residing at Lynchburg, in the county of Campbell and State of Virginia, have invented a new and useful Molding and Casting Apparatus, of which the following is a specification.

In a patent granted to me on September 10, 1901, and numbered 682,484 there is illustrated and described novel apparatus for molding and casting metal, which consists, substantially, in spaced mold-receiving benches forming an alley therebetween in which is movably mounted a table carrying suitable molding apparatus. The claims in the aforesaid patent cover only the construction of the supports for the molds shown in that instance as peculiarly-constructed benches, and the claims upon the remainder of the apparatus were required to be divided out.

The present invention relates to the same class of apparatus, and while the claims cover, broadly, certain combinations required to be eliminated in the former application, and therefore include the structure as a whole shown in said Patent No. 682,484, there are certain improvements embodied in this present structure that are of the greatest importance. In the apparatus illustrated in said patent the movable molding-table was supported on legs, upon the lower ends of which were journaled wheels that rested upon the molding-floor. These floors are often uneven, and the sand piled thereon was continually blocking the wheels, thereby stalling the table or throwing it out of its course, so that it would come into contact with the benches. This objectionable feature has been overcome by supporting the table or molding apparatus so that the sand will not interfere with its progress, and it will necessarily remain in its proper relation with respect to the mold-supporting means.

Heretofore it has been the custom to make a single mold at the time, and this could readily be transferred from the molding apparatus to the mold-support by hand; but I have devised means for making a plurality of molds simultaneously. This necessitates larger flasks, and the body of sand being greater the molds are of course much heavier. Another feature of the invention, therefore, is the provision of mechanical means for transferring the molds from the molding apparatus to the support where they are cast, thus not only lessening the labors of the workmen, but insuring more expeditious as well as more accurate and careful handling. The apparatus is of course useful for single molds, especially those of larger sizes, and the invention is capable of use in connection with flasks and molds of various sorts, though primarily intended, as in the patented structure, for use in the manufacture of plow-points.

The preferred embodiment of this invention is fully illustrated in the accompanying drawings and described in the following specification, though it will be readily apparent upon an inspection of the claims hereto appended that the invention is open to various changes and wide modifications from the structure shown and described.

In the drawings, Figure 1 is a side elevation of the improved apparatus. Fig. 2 is an end elevation of the molding-table. Fig. 3 is a top plan view of the same. Fig. 4 is a plan view of the apparatus.

Similar numerals of reference designate corresponding parts in all the figures of the drawings.

In the embodiment of the invention the molding-table is designated as a whole by the reference-numeral 10, substantially the same mold receiving or casting benches 11 being employed in connection therewith. These benches consist of standards 12, secured rigidly in an upright position by means of sleepers 13, firmly embedded in the floor and in this instance cast integral with the standards. Projecting from the upper ends of said standards are the outwardly-extending cross-arms 14, that form portions of the open frames of the benches. Connecting the upper ends of the standards 12 are horizontally-arranged rods 15, upon which are pivotally hung the mold-supporting platforms 16, upon which the flasks 17 and molds contained therein rest. This structure, as described, is substantially the same as that described and claimed in the aforesaid patent and in itself constitutes no part of the present invention. It may be changed as desired. Beneath the benches there are preferably arranged inclined platforms 18, that extend the entire lengths of the same and are designed to throw the sand and castings forward toward the alley formed between the spaced adjacent benches, as will be readily understood. The outstanding cross-arms 14 are provided in their outer ends with seats 19, and tracks 20, secured to the adjacent edges of the benches, are fitted in these seats, the tracks extending the entire lengths of the benches and constituting the supports upon which the table 10 runs.

The table 10 in the present instance is constructed of bars 21 and 22, secured together to form a rectangular open frame, the bars 22 projecting beyond the table at one side, as clearly shown at 23. Extending across this table are shafts 24, journaled in bearings 25, secured to the upper faces of the bars 22, said shafts carrying on their other projecting ends suitable flanged wheels 26, which rest upon the tracks 20. Supported upon the table 10 is any suitable molding apparatus, shown in the present construction as "matches" 27, designed to make a plurality of molds simultaneously. If desired, the apparatus described in either of my former patents granted September 10, 1901, and numbered 682,485 and 682,486, may be employed, or other apparatus of any known or desired construction may be used. It will be apparent, however, that molds made upon the apparatus shown will be of considerable weight and not readily transferred manually. In order, therefore, that such molds may be expeditiously handled, mechanical means are employed, which are preferably, though not necessarily, constructed as follows: Spaced standards 28 are secured to the rearwardly-projecting portions 23 of the frame-bars, these standards being made rigid by suitable braces, as 29, and tie-bolts 30. Attached to the upper ends of the standards are horizontally-disposed brackets 31, that project over the molding apparatus and have in their projecting ends seats, as 32. Secured to the free ends of the brackets 31 is a track 33, fitting in the seats 32 and extending across the table and over the mold-receiving or casting benches 11, this track being located directly over the centers of the matches, as clearly shown in Fig. 3.

Mounted upon the above-described track is the mold-transferring mechanism, consisting of a hanger 34, supported by wheels 35, which rest upon the track, said hanger having horizontally-disposed antifriction-rollers 36, that bear against the side of the track, and a depending hook 37, which is offset, so as to be located directly beneath the track, as shown in Fig. 2. From this hanger is suspended hoisting mechanism, which may be of any desired construction, though preferably in the form of an ordinary air-hoist comprising a cylinder 38, having an eye 39 at its upper end, in which the hook is engaged, and an ordinary plunger-rod 40, extending through its lower end. An air-supply pipe 41 leads to the cylinder from any suitable source of compressed air, the opening through said pipe being controlled by a valve 42, having operating means, shown in the form of an endless chain 43, extending about a suitable pulley 44, attached to the projecting end of the valve-stem. A flask-engaging bail 45 is attached to the projecting end of the piston-rod 40 and is provided with terminal hooks 46, arranged to engage pintles, as 47, arranged upon opposite portions of the flask-sections. At the ends of the track 33 are located stop-pins 48, which engage the hanger to limit the movement thereof, one of these pins being illustrated in Fig. 1 of the drawings.

The manner of using the apparatus is substantially the same as that described in my former patent, numbered 682,484. The flask-sections are first placed upon the matches located upon the molding-table, and the sand is shoveled from the floor into the flasks and rammed up, thus forming the two sections of the mold. The hoisting mechanism is then lowered and the bail is engaged with the "drag," which is then elevated and the carrier moved over one of the mold receiving or casting benches. The drag is then revolved to bring the mold-face uppermost, after which it is lowered to its position upon the mold-supporting platform 16. The carrier is then moved back, and the "cope" is in like manner raised and transported to its proper position upon the track, thus forming the complete mold and placing it in proper position for the casting operation. The empty flask is then taken from the opposite corresponding platform of the opposite bench, and the mold is in like manner made therein. After these two molds have been completed the molding apparatus is moved to the next set of flasks, and so on until the entire floor has been completed, after which the usual casting operation takes place, the molds are broken, and the castings removed. The advantages for this general combination have been fully set forth in the prior patent; but outside of these the improvements have particular advantages of their own. In the first place, the table being supported above the floor is completely out of the way of the sand, which will therefore not interfere with it. Moreover, this table now runs upon tracks which maintain it in its proper position and insure its easy movement. Further than this, the mechanical means for transferring the flasks and molds is exceedingly useful, as it saves much time and labor, and its action being steady and accurate there is a less percentage of broken or injured molds.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In apparatus of the class described, the combination with a bench arranged to support a plurality of molds, of molding apparatus disposed at one side of the bench and movable to different points along the same.

2. In apparatus of the class described, the combination with spaced mold-supports forming an alley or aisle between them, of a molding-table movably arranged in said alley or aisle.

3. In apparatus of the class described, the combination with a floor, of supporting means overhanging the floor, a track secured to the supporting means and elevated above the floor in spaced relation thereto, and molding apparatus movably mounted upon the track and disposed in spaced relation to the floor.

4. In apparatus of the class described, the combination with a floor, of supporting means extending above and overhanging the floor, spaced tracks secured to the supporting means and elevated above the floor in spaced relation thereto, and molding apparatus having wheels that run upon the track, said apparatus being disposed in spaced relation to the floor.

5. In apparatus of the class described, the combination with a mold-support, of a track secured thereto, and molding apparatus movably mounted on the track.

6. In apparatus of the class described, the combination with a mold-supporting bench, of a track secured to the upper portion of the bench, and molding apparatus having wheels that rest upon the track.

7. In apparatus of the class described, the combination with a mold-supporting bench arranged to hold a plurality of molds, of a track secured to the upper edge of the supporting-bench, and a molding-table having wheels that rest upon the track.

8. In apparatus of the class described, the combination with spaced mold-supports, of tracks secured thereto, and molding apparatus movably supported on the tracks.

9. In apparatus of the class described, the combination with a floor, of spaced mold-supports located above the floor, tracks secured to the adjacent portions of the mold-supports, and molding apparatus movably mounted upon the tracks.

10. In apparatus of the class described, the combination with horizontally-disposed mold-receiving benches adapted to support a plurality of molds and having outstanding arms, of horizontal tracks secured to the arms, and a molding-table having wheels that run upon the tracks.

11. In apparatus of the class described, the combination with supporting means arranged to receive a plurality of molds, of molding apparatus movable to different points along said supporting means, and mechanism for transferring the mold from the apparatus to the supporting means.

12. In apparatus of the class described, the combination with supporting means arranged to recive a plurality of molds, of molding apparatus movable to different points along said supporting means, and mechanism for transferring the mold from the apparatus to the supporting means, said mechanism being also movable to different points along the supporting means.

13. In apparatus of the class described, the combination with a suitable mold-support, of traveling molding apparatus coacting therewith, a track, and a mold-carrier movably mounted upon the track and arranged to transfer a mold from the molding apparatus to the support.

14. In apparatus of the class described, the combination with a suitable mold-support, of molding apparatus, a traveling overhead track arranged above said support and apparatus, and a mold-carrier movably mounted upon the track and arranged to transfer a mold from the molding apparatus to the support.

15. In apparatus of the class described, the combination with a suitable mold-support, of movable molding apparatus coacting therewith, a traveling overhead track arranged above said support and apparatus, and a mold-carrier mounted upon the track and arranged to transfer a mold from the molding apparatus to the support, said carrier comprising a hanger, hoisting mechanism suspended therefrom, and flask-engaging means secured to the hoisting mechanism.

16. In apparatus of the class described, the combination with a suitable mold-support, of movable molding apparatus, and means for transferring a mold from the molding apparatus to the support, said means being movable with the molding apparatus.

17. In apparatus of the class described, the combination with a suitable mold-support, of movable molding apparatus, and means for transferring a mold from the molding apparatus to the support, said means being supported upon the molding apparatus.

18. In apparatus of the class described, the combination with a suitable mold-support, of traveling molding apparatus coacting therewith, and means for transferring a mold from the molding apparatus to the support, said means including a track arranged above the molding apparatus and extending over the support, and a mold-carrier movably mounted upon the track.

19. In apparatus of the class described, the combination with a suitable mold-support, of traveling molding apparatus coacting with the support, a track arranged above the molding apparatus and extending over the support, and a mold-carrier movably mounted upon the track, said carrier including a wheeled hanger that runs upon said track, hoisting mechanism attached to the hanger, and flask-engaging means secured to the hoisting mechanism.

20. In apparatus of the class described, the combination with a suitable mold-support, of traveling molding apparatus coacting therewith, a track arranged above the molding apparatus and extending over the support, and a mold-carrier movably mounted upon the track, said carrier including a wheeled hanger that runs upon said track, hoisting mechanism suspended from the hanger and located beneath the track, and flask-engaging means attached to the hoisting mechanism.

21. In apparatus of the class described, the combination with a mold-support, of traveling molding mechanism, a track arranged above the mold-support and molding mechanism and movable with the latter, a wheeled hanger movably mounted on the track, hoisting mechanism attached to the hanger, and a flask-engaging bail suspended from the hoisting mechanism.

22. In apparatus of the class described, the combination with a mold-support, of traveling molding apparatus coacting with the support, a track arranged above the mold-support and molding apparatus, a wheeled hanger movably mounted on the track, an air-hoist attached to the hanger, and a flask-engaging bail suspended from the hoisting mechanism.

23. In apparatus of the class described, the combination with means for supporting a plurality of molds, of molding apparatus movable longitudinally along one side of the mold-supporting means, and a mold-carrier supported upon the apparatus and movable laterally over the supporting means.

24. In apparatus of the class described, the combination with mold-receiving benches arranged in spaced relation, of molding apparatus movable between the benches, and mold-transferring mechanism carried by the molding apparatus and movable over both the benches.

25. In apparatus of the class described, the combination with mold-receiving benches arranged in spaced relation, of molding apparatus movable between the benches, an overhead track supported upon the molding apparatus and extending over both benches, and a mold-carrier mounted upon the track.

26. In apparatus of the class described, the combination with mold-receiving benches arranged in spaced relation, of molding apparatus movable between the benches, an overhead track supported upon the molding apparatus and extending over both benches, and stops located at the ends of the track to limit the movement of the carrier.

27. In apparatus of the class described, the combination with spaced mold-receiving benches, of tracks attached to the adjacent upper edges of the benches, a mold-table having wheels which run upon said tracks, spaced standards secured to said table, outstanding brackets attached to the upper ends of the standards, a transverse track secured to the brackets and extending over the benches, and a mold-carrier supported upon the track and movable over both of said benches.

In testimony that I claim the foregoing as my own I have hereto affixed my signature in the presence of two witnesses.

JAMES R. McWANE.

Witnesses:
S. G. STEVENS,
JAS. R. BROWN.